(12) United States Patent
Bly et al.

(10) Patent No.: US 6,959,608 B2
(45) Date of Patent: Nov. 1, 2005

(54) ULTRA-MINIATURE PRESSURE SENSORS AND PROBES

(75) Inventors: Mark J. Bly, Falcon Heights, MN (US); Thomas W. Kenny, San Carlos, CA (US); Sara A. Shaughnessy, Menlo Park, CA (US); Michael S. Bartsch, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 214 days.

(21) Appl. No.: 10/445,276

(22) Filed: May 23, 2003

(65) Prior Publication Data

US 2005/0103114 A1 May 19, 2005

Related U.S. Application Data

(60) Provisional application No. 60/383,063, filed on May 23, 2002.

(51) Int. Cl.$^7$ .............................................. G01L 9/00
(52) U.S. Cl. .......................................... 73/754; 73/753
(58) Field of Search .................................. 73/700–756

(56) References Cited

U.S. PATENT DOCUMENTS 4,588,472 A * 5/1986 Shimizu ...................... 438/53
6,507,187 B1 * 1/2003 Olivas et al. ........... 324/207.21

OTHER PUBLICATIONS

S. Zappe, E. Obermeier et al., "Piezoresistive pressure sensor based on 3C–SUC–ON–SOI for high temperature and high pressure applications," retrieved on Apr. 25, 2003. Retrieved from the internet: <URL: http://www-mat.ee.tu-berlin.de/papers/public99/pdf99/zappe1.pdf>.

S Marco et al., "High–performance piezoresistive pressure sensors for biomedical applications using very thin structured membranes," retrieved on Apr. 25, 2003. Retrieved from the internet: <URL: http://www.wam.umd.edu/~kone/Ref_5.pdf>.

* cited by examiner

*Primary Examiner*—William Oen
*Assistant Examiner*—Jermaine Jenkins
(74) *Attorney, Agent, or Firm*—Lumen Intellectual Property Services, Inc.

(57) ABSTRACT

A new and versatile ultra-miniature pressure sensor comprises a very thin diaphragm of approximately one micron or less, e.g., 0.2 microns. In some embodiments, the diaphragm has a radius of 20 microns and the pressure sensor can detect signals at or near 0.1 Atm with 1% accuracy. The diaphragm is formed by epitaxial growth of silicon or by bonding and etching. A plurality of high sensitivity piezoresistive strain gauges measure strain of the diaphragm. Less than 0.1 microns thick, the piezoresistive strain gauges are embedded in the diaphragm by ion implantation or formed thereon by epitaxial growth. The ability to form ultra-thin piezoresistive layers on very thin diaphragms enables the miniaturization of the pressure sensor as well as any device that employs it.

12 Claims, 10 Drawing Sheets

ULTRA-MINIATURE PRESSURE SENSORS AND PROBES

CROSS-REFERENCE TO RELATED APPLICATION

This application claims the benefit of a provisional patent application No. 60/383,063, filed May 23, 2002, the entire content of which is hereby incorporated herein by reference.

FIELD OF THE INVENTION

The present invention relates generally to pressure sensors and probes. More particularly, the present invention relates to methods and devices for ultra-miniature pressure sensors and probes that utilize ultra-thin diaphragms and that can be used in small places.

BACKGROUND

Many applications, particularly biomedical applications, require pressure measurements in very small places. For instance, measurements inside the cardiovascular systems of small mammals and even insects, within instrumented glaucoma valves, attached to miniaturized stents, and many others. Within the human cardiovascular system, there are arteries that are too narrow for conventional catheter-based pressure sensing techniques, or where the risk of introduction and removal is too great because of the large size of existing sensors. A recent, well-publicized example of heart surgery on an unborn fetus presents an interesting example case in which ultra-miniature pressure sensors would have allowed in-situ measurements of cardiac pressure during the procedure, greatly reducing the risk. Although this particular procedure was a success, many elements of this procedure could be improved by utilizing ultra-miniature pressure sensors or minimally-invasive probes to record signals.

Conventional micro-machined pressure sensors allow catheter-based measurements on adults and in many other situations. The largest of these sensors are several mm in cross-section, and are used for automotive applications (intake pressure, fuel tank pressure, etc.). A prior art sensor chip 100 is shown in FIG. 1A with a cross-sectional view thereof along line A–A' shown in FIG. 1B. The sensor chip 100 comprises a silicon membrane 102 and piezoresistors 104. The chip size is 3 mm×3 mm and 300 $\mu$m thick. The width and length of each piezoresistors 104 are 15 $\mu$m and 150 $\mu$m, respectively. The piezoresistors 104 are mesa-etched and connected in a Wheatstone Bridge configuration. The membrane 102 has a depth of 250 $\mu$m defined by isotropic Reactive Ion Etching (RIE) of a silicon (Si) substrate. The cavity 106 is 1 mm in diameter and 50 $\mu$m in depth.

These micro-machined pressure sensors are also used for medical applications, such as for digital blood pressure instruments, and for measurements in which a fluid-filled catheter extends from the region where pressure is being studied to an external sensor. The use of a fluid-filled catheter to transmit the pressure allows use of accurate and bulky instrumentation, but suffers because of the distortion of the pressure signal during transmission. Mainly, this approach can transmit average pressure well, but the dynamic signals are distorted because of the propagation down the catheter.

All of these sensors are formed by etching cavities in a silicon wafer, bonding a second wafer to seal the cavity, forming piezoresistive strain gauges by ion implantation, and adding metallization to allow electrical contacts to external circuits. This approach has been commercially successful for many years and results in low-cost, high-performance sensors for many applications. The dimensions of these sensors are usually restricted to thickness and lateral dimensions greater than 0.3 mm. Partly, this is due to the wet chemical etching techniques used to controllably define membrane thicknesses, and partly this is due to the thickness of the starting silicon wafers.

Therefore, there is a need in the art for new methods and designs of pressure sensors and probes that overcome the limitations of currently available sensors and probes. More particularly, there is a need for pressure sensors on the sub-100 $\mu$m scale with the appropriate sensitivity and small enough to be placed on a probe with cross-sectional dimensions that are less than 100 $\mu$m.

SUMMARY OF THE INVENTION

Accordingly, it is an object of the present invention to provide a new and versatile pressure sensor and probe apparatus that would allow a number of first-ever direct measurements of pressure in some very small anatomical spaces, and feature very high bandwidth and accuracy needed to produce high-fidelity recordings of pressure fluctuations. The present invention provides methods of designing and making ultraminiature pressure sensors with ultra-thin diaphragms of approximately one micron or less, e.g., 0.2 microns. In some embodiments, all dimensions of an ultraminiature pressure sensor are smaller than 0.1 mm. The miniaturized dimensions allow the ultraminiature pressure sensor be positioned on a shank or otherwise mounted or integrated on the tip of a probe suitable for, e.g., insertion into tissue with minimal damage or disruption thereto.

A key aspect of the present invention is that the thickness of the pressure sensing diaphragm is reduced to about 1 micrometer or less. This allows the lateral dimensions to be correspondingly reduced, while maintaining the same electrical sensitivity to pressure signals. The thickness reduction is enabled with the use of doped epitaxial silicon piezoresistors. The ability to form ultra-thin piezoresistive layers on very thin diaphragms enables the miniaturization of the pressure sensors as well as any probes and devices that employ them.

The piezoresistive strain gauges could be constructed to form a Wheatstone Bridge, with 2 of the strain gauges positioned on the diaphragm, and 2 of the strain gauges positioned on the neighboring support material. This arrangement allows for subtraction of piezoresistor offsets due to temperature, resulting in very high accuracy. One important advantage of the use of piezoresistive strain gauges for pressure measurements is that off-chip electrical circuitry may be used to amplify and condition signals. The raw sensitivity of piezoresistive strain gauges in this device allows signal processing without the need for fully-integrated circuitry, which allows for a greatly simplified fabrication process.

Fabrication of ultraminiature pressure sensing devices is possible by a variety of approaches, one of which disclosed herein utilizes a single silicon on insulator (SOI) wafer. The use of a single SOI wafer is enabled using an HF vapor etch and filling the hole in the diaphragm with an oxide plug. Because the top silicon layer of an SOI wafer can be used to form the ultra-thin diaphragm, this method allows for an even smaller diameter diaphragm. Alternatively, two SOI wafers may be used. Additional objects and advantages of the present invention will become apparent to one skilled in the art upon reading and understanding the drawings and detailed description disclosed hereinafter.

DETAILED DESCRIPTION

Figure 1A:
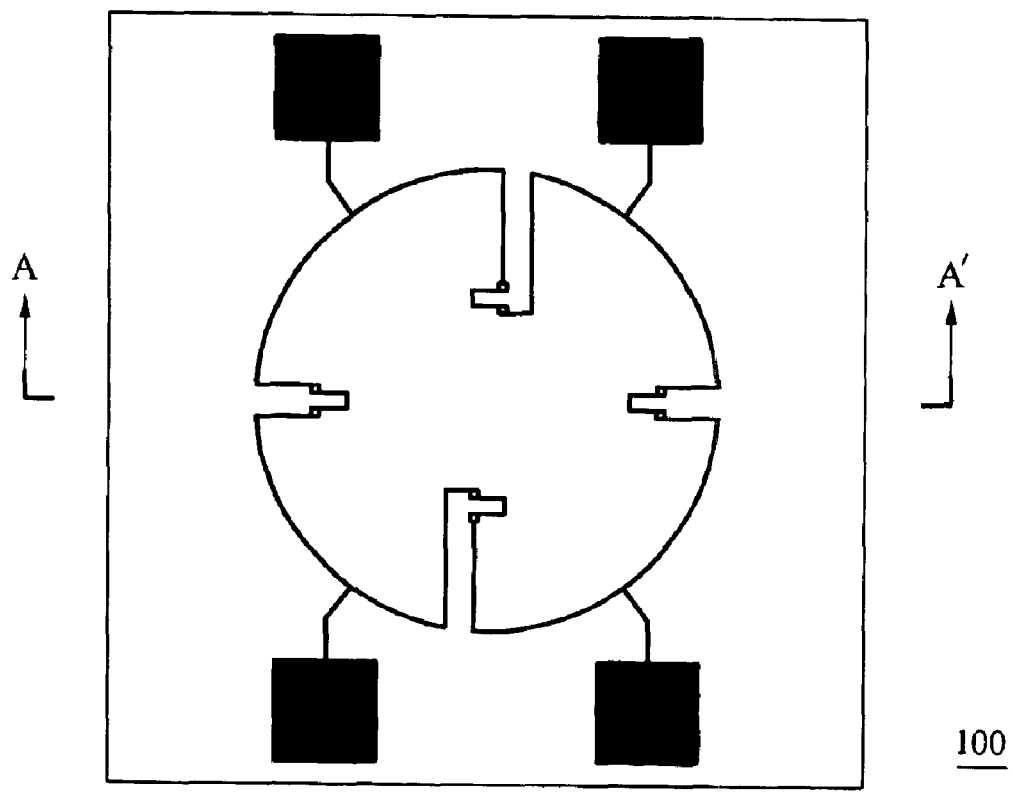
FIGS. 1A–1B illustrates a prior art pressure sensor.

As discussed before, conventional piezoresistive sensors are formed by ion implantation of Boron ions into the surface of a Si wafer. This process is carried out at high implant energy, and results in a layer of boron-doped material that can be several microns thick. The thickness of this doped layer restricts the use of boron ion implantation to structures of at least 5 microns thick. This is the reason that most piezoresistive pressure sensors utilize 10–20 micron membranes. In order to have useful sensitivity to signals of interest, the lateral dimensions must be increased as well, which leads to minimum dimensions of 0.3 mm for commercial piezoresistive sensors.

Inventor Dr. Kenny's group at Stanford University has been exploring methods of forming ultra-thin piezoresisitve layers in silicon. Rather than relying on ion implantation to form these layers, Dr. Kenny's group has been growing very thin films of doped epitaxial silicon, e.g., 30 nm boron doped films in 1999, and later 20 nm doped films in 2001 (J. A. Harley & T. W. Kenny, *High Sensitivity Piezoresistive Cantilevers under 1000 Å Thick*, Appl. Phys. Lett. 75, 289–291 (1999); Y. Liang, S-W Ueng & T. W. Kenny, *Performance Characteristics of Ultra-Thin n-Type Piezoresistive Cantilevers*, Proceedings Transducers '01, Munich Germany, p. 998 (2001)). The fabrication methods described in these papers were tailored to very thin cantilever beams for detecting small forces in AFM systems.

An important enabling aspect of the present invention is the use of doped epitaxial silicon piezoresistors, which allows for the thickness of the pressure sensing diaphragm be reduced to about 1 micrometer or less. The lateral dimensions are consequently and correspondingly reduced as well. This can be explored by examining the relationship between the pressure and the stress in a thin circular diaphragm:

$$\sigma = \frac{3R^2}{4t^2} P \qquad \text{EQ. 1}$$

where P is the pressure difference from the exterior to the cavity, R is the radius of the pressure diaphragm, and t is the thickness of the diaphragm.

One can see that reductions in thickness allow proportional reductions in the lateral dimensions of the sensor. Thus, by scaling the membrane thickness from 10 microns to 1 micron, the lateral dimensions are also scaled from 0.3 mm to 30 microns, while offering exactly the same electrical sensitivity to pressure signals.

An exemplary method of designing an ultraminiature pressure sensor may comprise the following steps. The strain in the upper surface of a piezoresistive diaphragm pressure sensor is given by EQ. 1. As such, for R=20 µm, t=1 µm, and P=2×10$^4$ Pa, the stress would be 6×10$^6$ Pa, and the strain would be about 3×10$^{-5}$. For a silicon piezoresistive strain gauge, gage factors of 50 or more are common. Accordingly, the fractional change in resistance (DR/R) is 50× larger than the strain, or about 0.1%, which is easily read using instrumentation amplifiers. The smallest signal to be detected with this instrument is probably about 1% of this signal, resulting in a 0.001% resistance signal, which is challenging, but still easily detectable. Based on these numbers, a pressure sensor with these dimensions should be capable of detecting pressure signals near 0.1 Atm, and with 1% accuracy.

The piezoresistive strain gauges could be constructed to form a Wheatstone Bridge known in the art, with two of the strain gauges positioned on the diaphragm, and two of the strain gauges positioned on the neighboring support material. This arrangement allows for subtraction of piezoresistor offsets due to temperature, resulting in very high accuracy. One important advantage of the use of piezoresistive strain gauges for pressure measurements is that off-chip electrical circuitry may be used to amplify and condition signals. The raw sensitivity of piezoresistive strain gauges in this device allows signal processing without the need for fully-integrated circuitry, which allows for a greatly simplified fabrication process.

Figure 2:
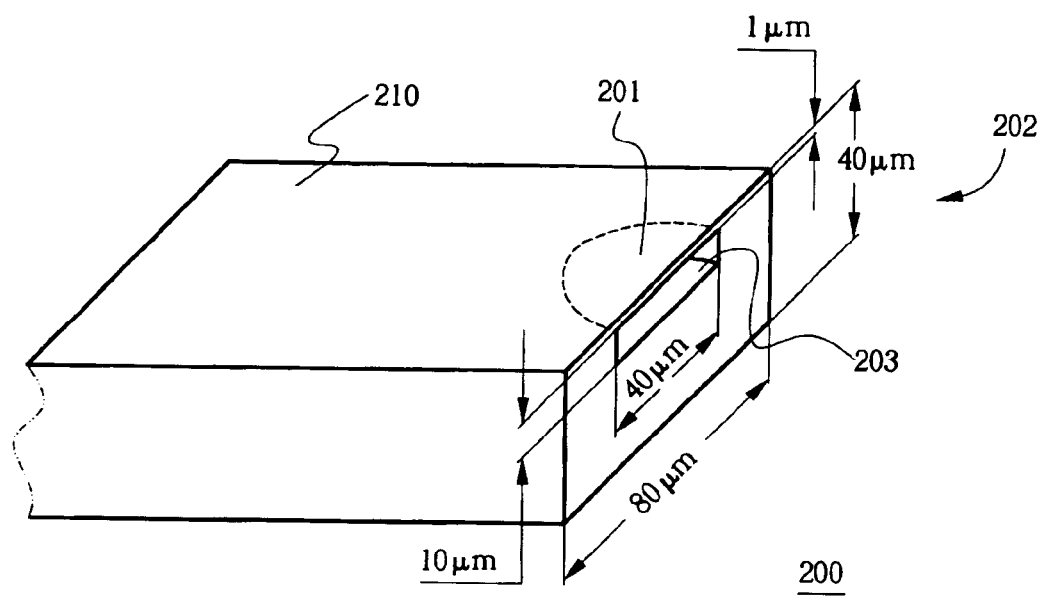
FIG. 2 is a cross-sectional view of a probe shaft with a 1 µm diaphragm.
Figure 3:
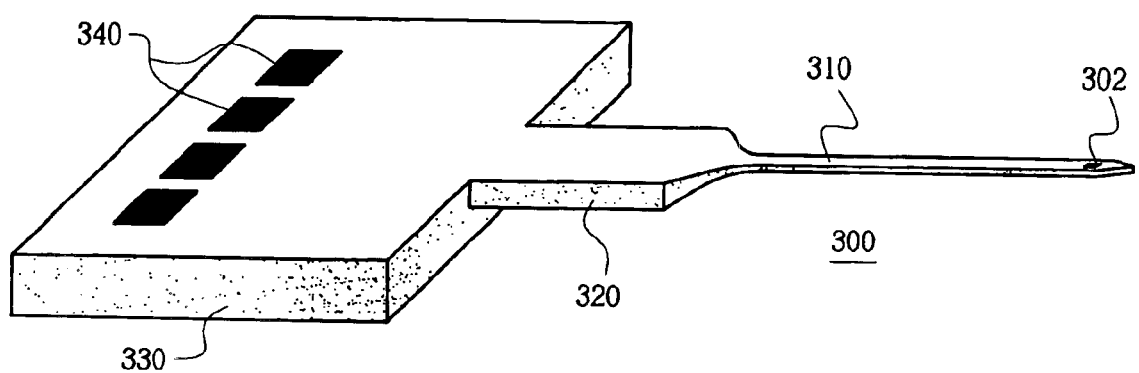
FIG. 3 illustrates a microprobe-based pressure sensor probe.

In addition, it is possible to form a support probe during the fabrication process of the ultraminiature pressure sensor. The micro-fabricated probe would allow placement of the pressure sensor into a tissue sample or into an artery through the wall of that tissue. Because the dimensions of the sensor are very small, it is possible for the cross-sectional dimensions of this micro-machined probe to be significantly smaller than 100 micrometers. The integration of the sensor and the probe is possible because of the unique electrical and mechanical properties of silicon, especially the possibility of forming high-sensitivity piezoresistive strain gauges by ion implantation. FIGS. 2 and 3 show the dimensions of a micro-fabricated probe. FIG. 2 shows cross-sectional dimensions of a probe tip with sealed cavity according to the present invention. FIG. 3 is a schematic drawing of the micro-fabricated pressure sensor probe according to an aspect of the present invention.

Figure 1B:
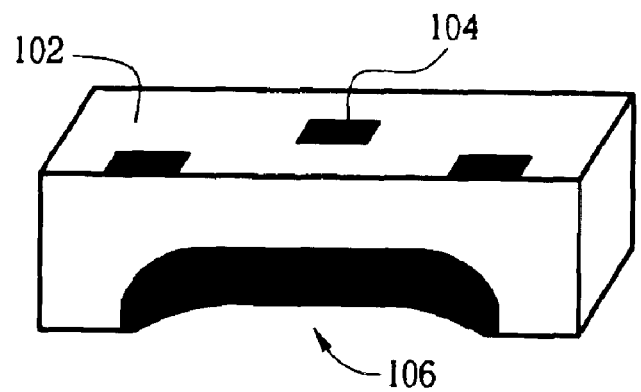

As shown in FIG. 2, the pressure sensor probe tip 200 includes an ultraminiature pressure sensor 202 having a thin diaphragm 201 with embedded piezoresistive strain gauges (not shown). The diaphragm 201 is about 1 µm thick, with lateral dimensions of about 40 µm×40 µm. The supporting shaft 210 is approximately 40 µm thick and as much as 80 µm wide. As will be discussed later, the sealed cavity 203 may contain a vacuum reference, or be vented by a narrow channel back to the handle to atmospheric pressure. To form a pressure sensor, piezoresistive strain gauges are formed in the top surface of the diaphragm 201 by ion implantation, and electrical connections from these resistive strain gauges to the handle of the device are formed by heavy ion implantation of pathways running along the top surface of the shaft and shank to the top surface, where metal electrodes are positioned as is exemplified in FIGS. 1A–1B.

In the case of diaphragms thinner than 2 micrometers, ion implantation would result in dopant penetration throughout the entire thickness of the diaphragm, and this would significantly reduce the sensitivity of the strain sensor. The present invention utilizes epitaxial growth of a doped layer. This allows precision control over the placement of the dopant ions with respect to depth, and enables formation of sensitive strain gauges in layers thinner than 0.1 micrometers. Using doped epitaxial silicon piezoresistors, we can build pressure sensors with diaphragm thickness ranging from 2 micrometers to less than 0.1 micrometers.

In a majority of cases, the placement of a pressure sensor on the end of a microfabricated needle with length of cm would allow positioning of the pressure sensor at the critical location with a minimum of disruption of the surrounding tissue. FIG. 3 illustrates a concept for a microprobe-based pressure sensor probe 300 where a miniaturized strain gauge pressure sensor 302 is formed at the end of a micro-machined silicon probe tip. More specifically, a micron-scale shaft 310 supports the very small pressure sensor 302 that is intended for direct measurements within extremely small anatomical volumes. This pressure sensor 302 can have cross-sectional dimensions that are as small as 40 $\mu$m×40 $\mu$m, and occupy a depth of about 10 $\mu$m or less, as illustrated in FIG. 2.

This pressure sensor 302 may be formed within a single 80 $\mu$m×80 $\mu$m chip that would be attached to the end of a catheter guide wire, or to any other minimally-invasive probe element. Alternatively, the pressure sensor 302 may be formed within a shaft with thickness of less than 20 $\mu$m, which is mounted at the end of a stiffer shank 320 with cross-sectional dimensions of up to 1 mm and thickness from 100 to 300 $\mu$m. The length of the shaft and shank may be tailored to meet the needs of the application, and can range from less than 0.5 mm to as much as 10 mm or more. The purpose of the shank 320 is to provide mechanical support for insertion of the probe into tissue, without disrupting the tissue at the sensed region near the tip. In this particular example, the handle 330 is much larger, and is intended as an interface, via electrical connections 340, between the probe 300 and macroscopic electrical connectors (not shown).

Figure 4A:
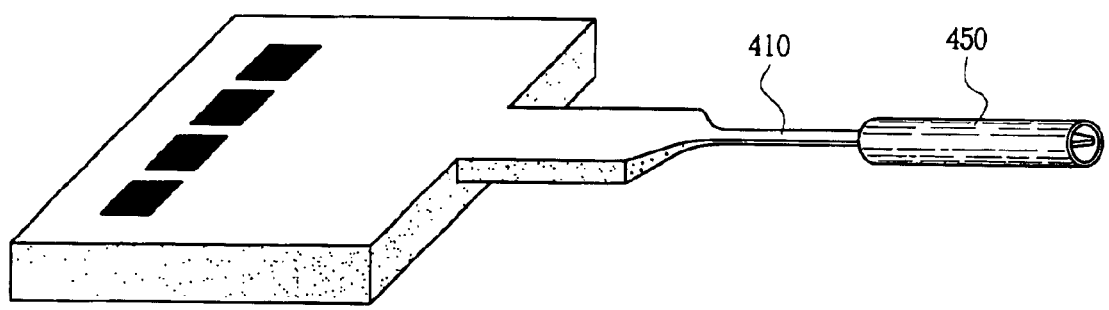
FIGS. 4A–4B shows a pressure sensor probe being guided within a protective sheath.
Figure 4B:
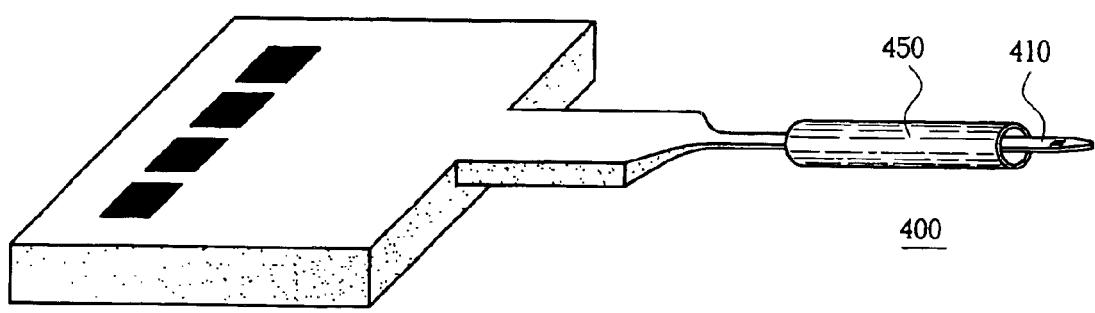

Depending on applications, the microprobe-based pressure sensor probe 300 can be integrated or otherwise implemented with various instruments. For example, a sheath may be used to guide and protect the shaft 410 of the pressure probe 400 to a critical region. As shown in FIG. 4A, the sheath 450 would extend beyond the tip of the pressure probe 400 during penetration of outer tissue, and be retracted to expose the shaft 410 during penetration of the last layer of tissue surrounding the sensed region, as shown in FIG. 4B.

Figure 5:
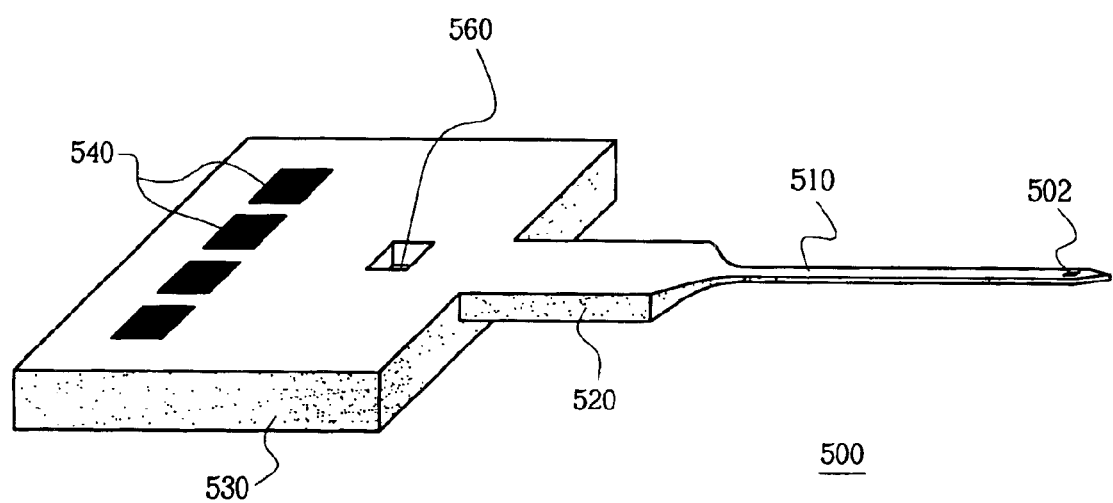
FIG. 5 illustrates a vented pressure sensor probe.

In some embodiments, the pressure sensor probe may include a vent to allow differential pressure to be measured from the tip to the outside reference. FIG. 5 shows an exemplary vented pressure probe 500 in which a narrow channel (not shown) running from the pressure sensor 502 through the shaft 510 and the shank 520 to the vent 560 on the handle 530 is formed during the fabrication process. The handle 530 also has electrical connections 540.

Figure 6:
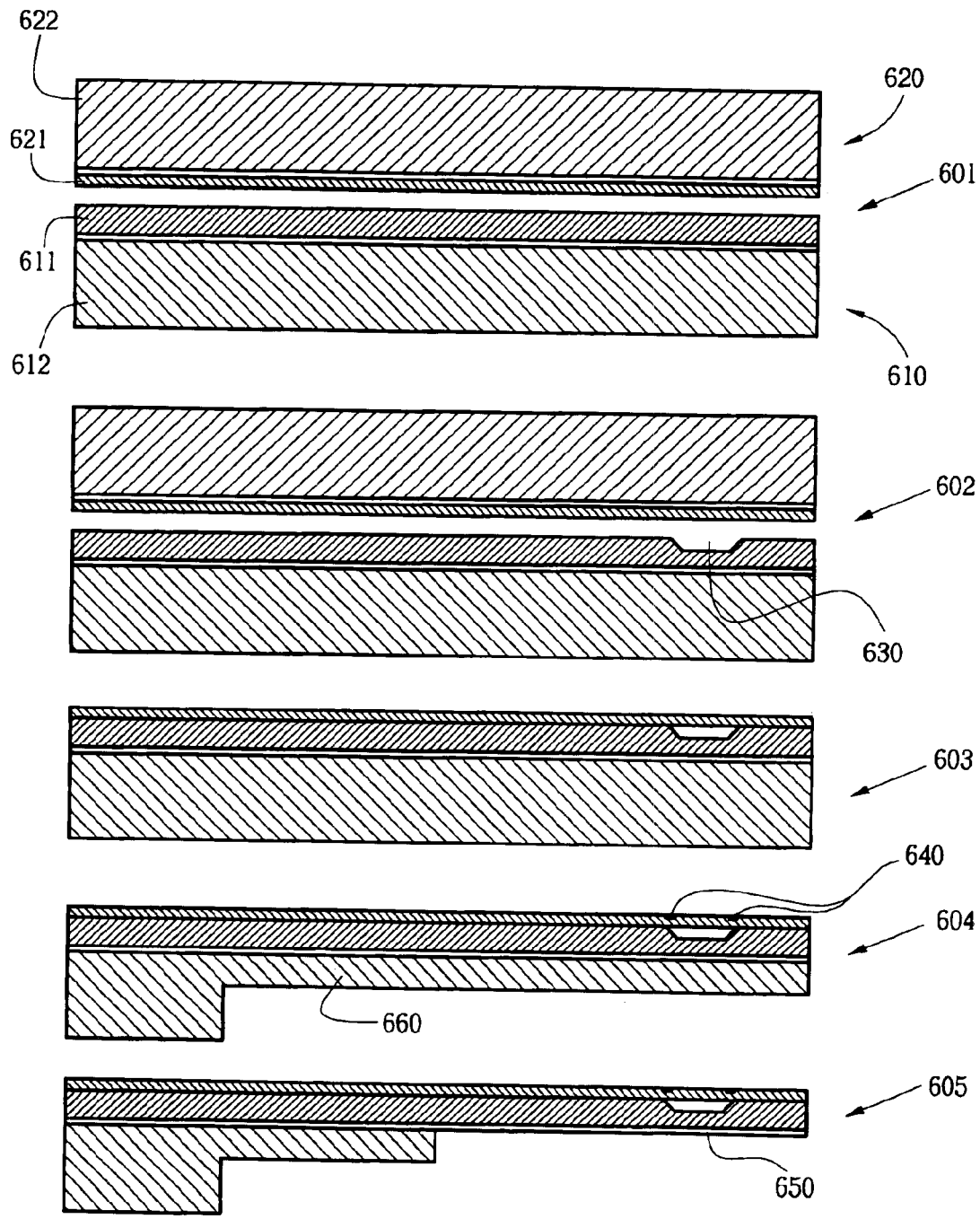
FIG. 6 demonstrates a method of fabricating the pressure sensor probes of FIGS. 3–5.
Figure 7A:
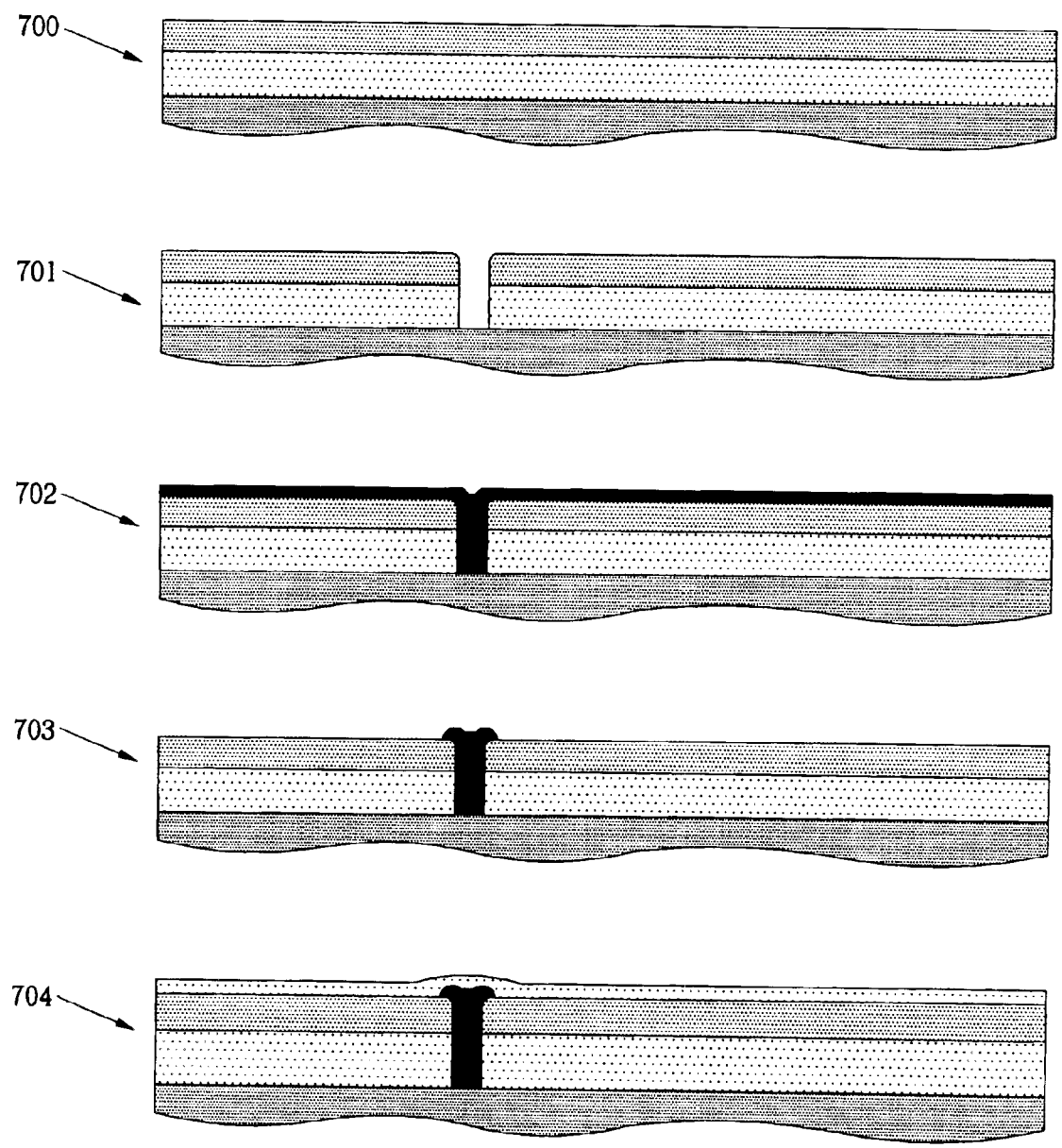
FIGS. 7A–7E demonstrate another method of fabricating the pressure sensor probes of FIGS. 3–5.
Figure 7B:
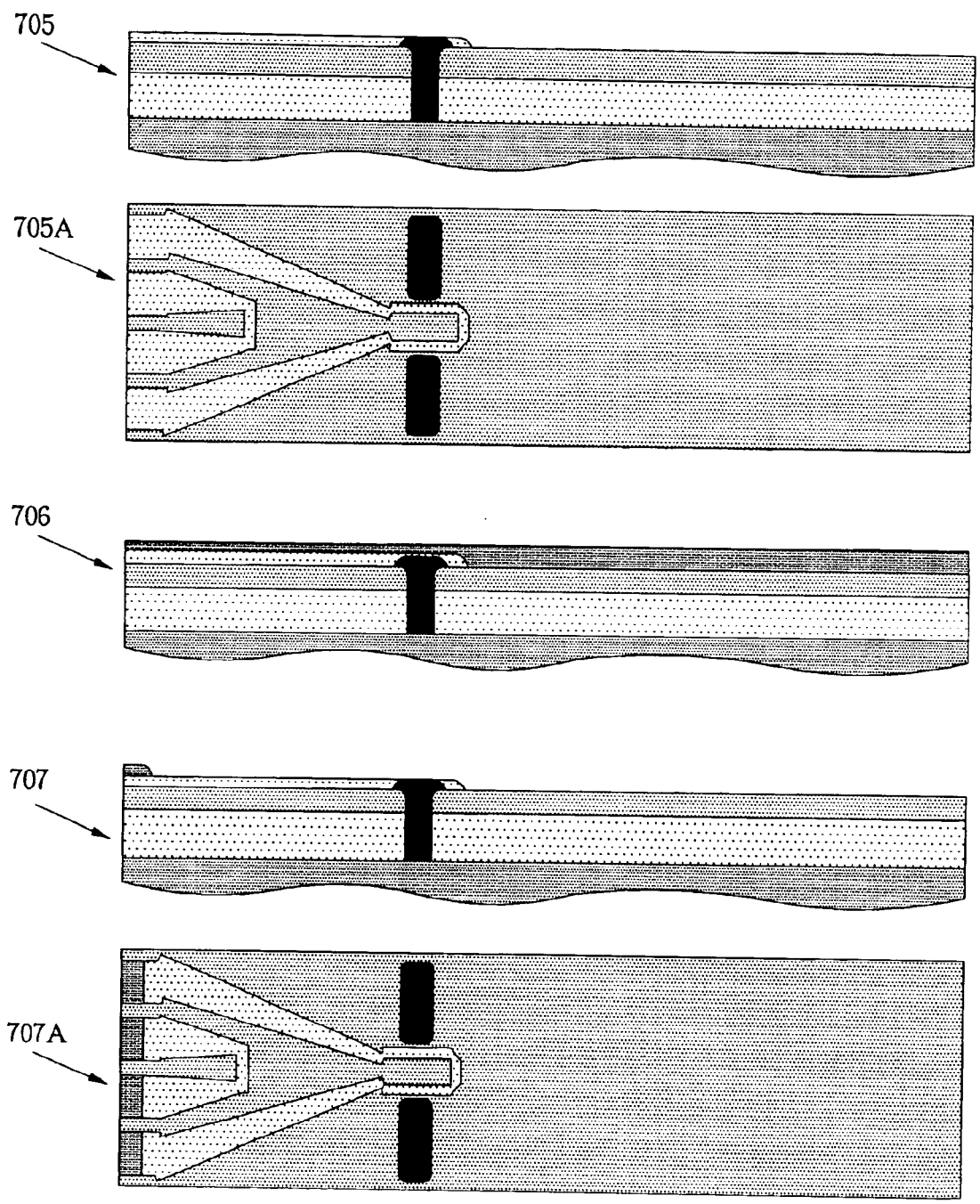
Figure 7C:
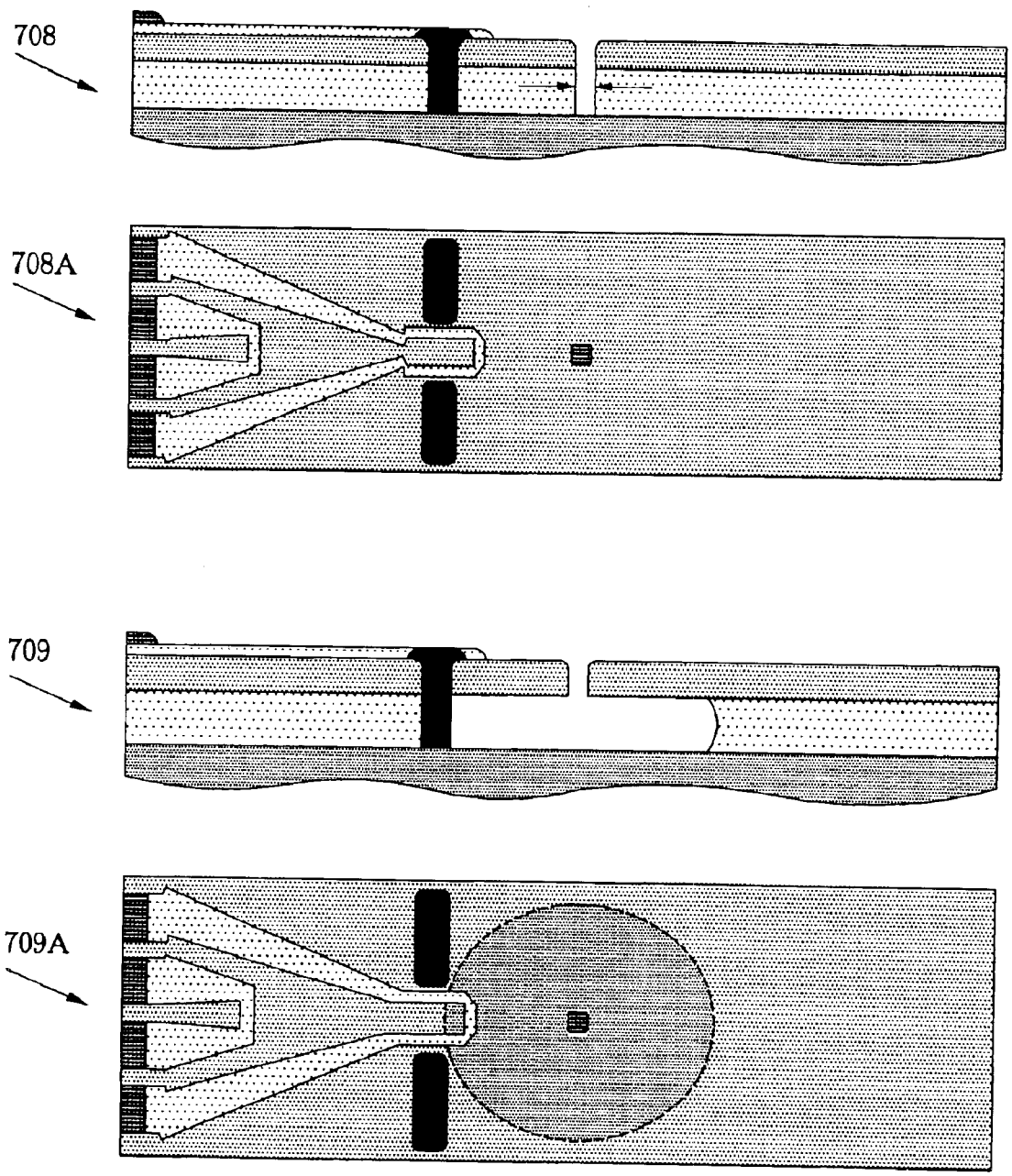
Figure 7D:
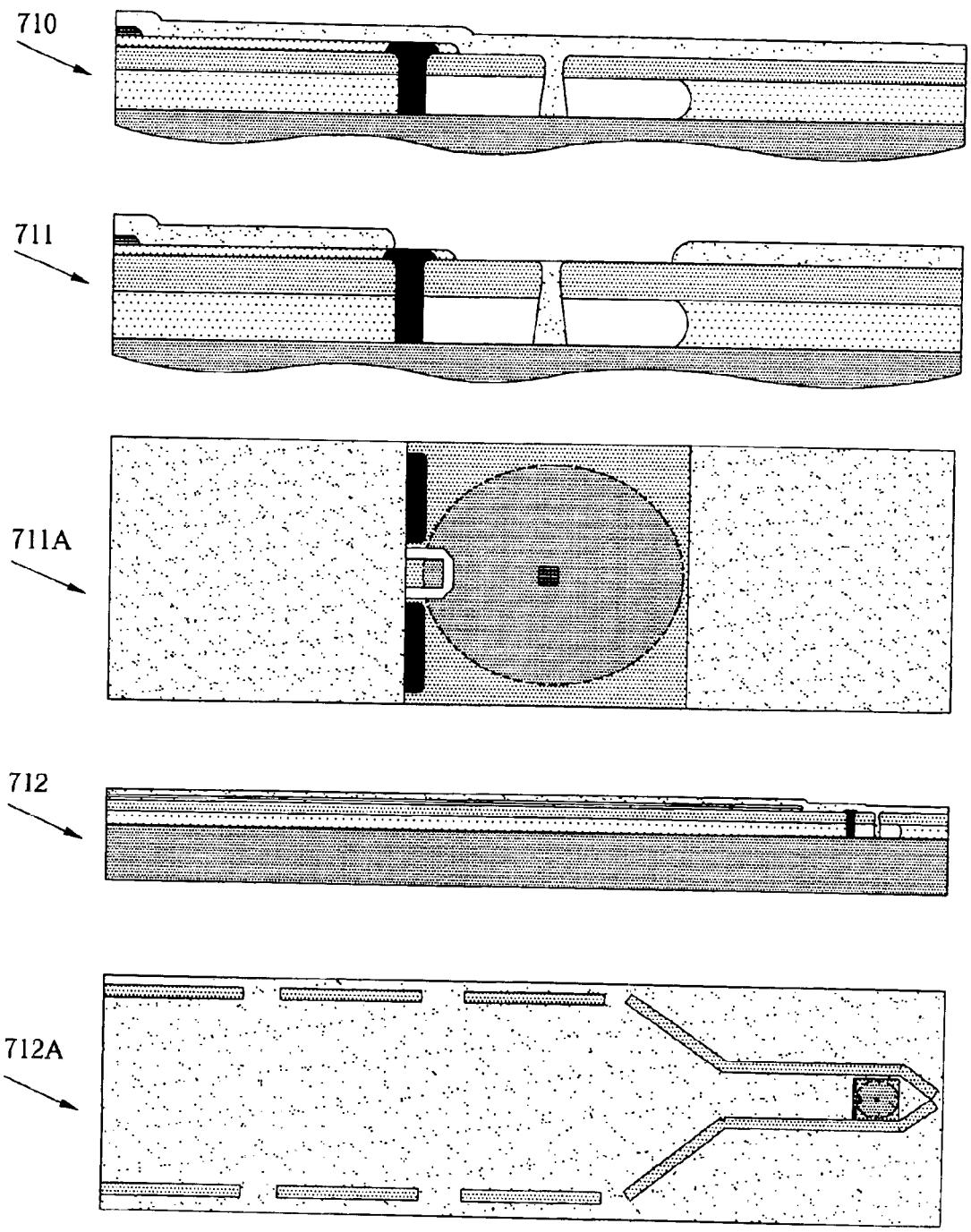
Figure 7E:
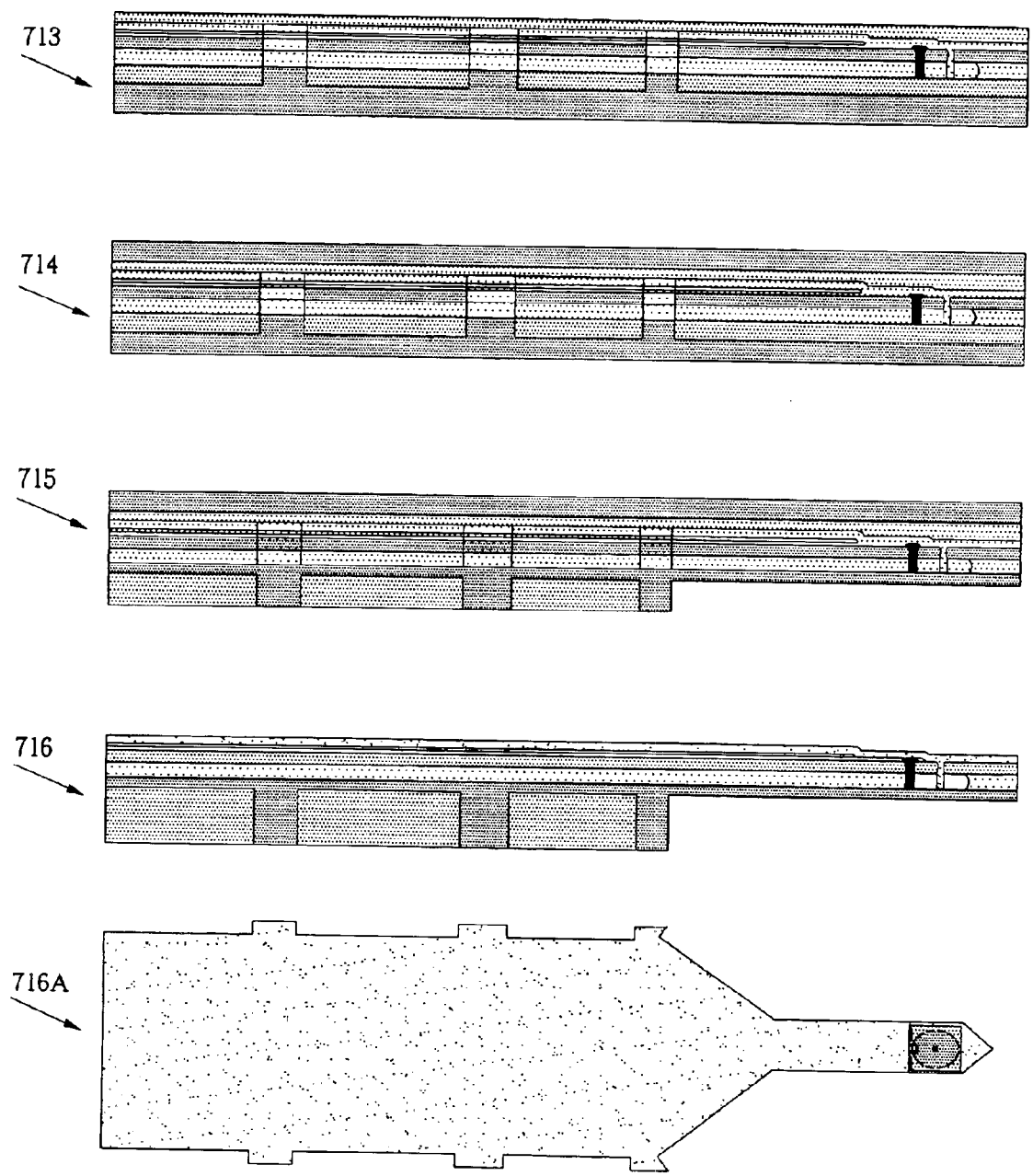

Fabrication of the pressure sensing device as exemplified in FIGS. 3–5 is possible by a variety of approaches. For instance, the pressure sensing device could be fabricated by the steps illustrated in FIG. 6. In step 601, a pair of SOI wafers is prepared. One wafer 610 could have a 40 micron top silicon layer 611, and the other 620 could have a 1 micron top layer 621. In step 602, the 40 micron layer 611 is patterned and etched to form a shallow cavity 630 that is 40 microns wide and only 1 micron deep. In step 603, the wafers 610, 620 are bonded together, sealing the cavity 630. The substrate 622 of the thin SOI wafer 620 is etched away, leaving a single wafer 610 with a thick substrate 612, a 40 micron layer 611 with a cavity 630, and a 1 micron thick top layer 621. Epitaxial silicon growth is used to form a thin layer of doped silicon on top of the wafer, and plasma etching is used to remove the doped epitaxial silicon from all locations except for the regions on the diaphragm that are required to be strain sensitive. In step 604, heavier-dose ion implantation is used to form conductive electrical connections to the strain gauges 640 and to the contact pads (not shown) at the handle end of the device. Plasma etching is used to define the lateral dimensions of the probe tip, and a back-side plasma etch thins most of the substrate 612 from 500 microns to the shank thickness, which is about 100 microns. A second backside plasma etch thins the probe region to the 40 micron thickness defined by the buried oxide layer 650, as shown in step 605.

In cases where it is advantageous to vent the sealed cavity to the outside, as discussed before with reference to FIG. 5, it is possible to form a narrow channel leading from the recess etched at the right edge of the die leading all the way back to the handle. After sealing, this channel can be vented to the outside by etching through the topside silicon where the channel terminates on the handle. More specifically, the vent can be formed during step 602 by etching a narrow channel in the top of the thick SOI wafer 610 that runs from the pressure sensor cavity 630 back along the shank 660 to the handle. The main advantage of such a design is that the average static pressure applied to the diaphragm is much less than a full atmosphere, so it is possible to design with thinner diaphragms to increase the sensitivity, or to make even smaller pressure sensor probes for applications that require even smaller cross-sections. In this case, it is therefore possible to reduce the cross-sectional dimensions of the probe tip to less than 25 $\mu$m×10 $\mu$m with a vented probe.

Another fabrication approach is shown in FIGS. 7A–7E. A silicon wafer with a buried oxide layer is used (Step 700). First, a small gap (~2 microns wide) is etched through the silicon and oxide layers (Step 701). The wafer is covered with nitride and most of it is removed so that only the etched gap is filled with nitride (Steps 702 and 703). A layer of doped epitaxial silicon is then added and etched to reveal the piezoresistors and leads (Steps 704 and 705, with 705A being a top view of 705). Aluminum is added and etched to reveal the aluminum leads and bond pads (Steps 706 and 707, with 707A being a top view of 707). A small hole (~2 microns wide) is etched through the silicon (Step 708, with a top view 708A) to provide access for the HF vapor etch that creates the diaphragm cavity (Step 709, with a top view 709A). The wafer is then covered with a low temperature oxide (LTO) layer for protection and to fill the hole in the diaphragm (Step 710). The LTO is then etched away from the diaphragm surface so that the sensitivity of the diaphragm is not greatly reduced (Step 711, with a top view 711A). A topside plasma etch is next performed to begin to release the sensor probe from the wafer (Step 712, with a top view 712A). The sensor probe is covered with photoresist (Step 713) and a second wafer is bonded to the surface (Step 714) to prepare for the backside etch (Step 715) that reveals the probe and releases the backside of the structure from the wafer. After the backside etch, the bonded wafer and photoresist are removed (Step 716, with a top view 716A).

This fabrication approach has advantages over the aforementioned method. The new fabrication approach utilizes a single SOI wafer as opposed to two SOI wafers. The use of a single SOI wafer is enabled using an HF vapor etch and filling the hole in the diaphragm with an oxide plug. Because the top silicon layer of an SOI can be used as the diaphragm (having thickness down to 0.3 microns), the method described here allows for an even smaller diameter diaphragm. The nitride stop is another novel part to the invention. It acts to stop the HF vapor etch near the piezo resistors so that maximum sensitivity can be achieved.

Although the present invention and its advantages have been described in detail, it should be understood that the present invention is not limited to or defined by what is shown or described herein. Known methods, systems, or components may be discussed without giving details, so to avoid obscuring the principles of the invention. As it will be appreciated by one of ordinary skill in the art, various changes, substitutions, and alternations could be made or otherwise implemented without departing from the principles of the present invention. For example, the dimensions of the shaft, shank and handle can be selected over a very wide range as needed to meet the particular needs of a measurement application, such as measurements of pressure fluctuations within a small mammal aorta, pressure measurements within otherwise inaccessible chambers in the adult human cardiovascular system, or for measurements at locations where the damage caused by repeated insertion and extraction of the larger conventional tools for pressure measurement would be unacceptable. The methods for fabrication of devices with radically different dimensions are essentially the same as discussed above with reference to the exemplary sensors and probes. As such, the drawings are for purposes of illustrating a preferred embodiment(s) of the present invention and are not to be construed as limiting the present invention. Accordingly, the scope of the invention should be determined by the following claims and their legal equivalents.

We claim:

1. An ultraminiature pressure sensing apparatus comprising:

a pressure sensing membrane made of silicon and having a thickness of approximately one micron or less; and a plurality of high sensitivity piezoresistive strain gauges for measuring strain of said membrane; wherein said ultraminiature pressure sensing apparatus is capable of detecting pressure signals at or near 0.1 Atm.

2. An ultraminiature pressure sensing apparatus comprising:

a pressure sensing membrane made of silicon and having a thickness of approximately 0.2 microns or less; and a plurality of high sensitivity piezoresistive strain gauges for measuring strain of said membrane; where said ultraminiature pressure sensing apparatus is capable of detecting pressure signals at or near 0.1 Atm.

3. The ultraminiature pressure sensing apparatus of claim 1 or 2, in which lateral dimensions of said ultraminiature pressure sensing apparatus are directly proportional to said thickness.

4. The ultraminiature pressure sensing apparatus of claim 1 or 2, in which said membrane has a radius of 20 microns.

5. The ultraminiature pressure sensing apparatus of claim 1, in which said pressure signals are detected with 1% accuracy.

6. The ultraminiature pressure sensing apparatus of claim 1 or 2, in which said membrane is formed by epitaxial growth of silicon.

7. The ultraminiature pressure sensing apparatus of claim 1 or 2, in which said membrane is formed by bonding and etching.

8. The ultraminiature pressure sensing apparatus of claim 1 or 2, in which said piezoresistive strain gauges are less than 0.1 microns thick.

9. The ultraminiature pressure sensing apparatus of claim 1, in which said piezoresistive strain gauges are embedded in said membrane by ion implantation.

10. The ultraminiature pressure sensing apparatus of claim 1 or 2, in which said piezoresistive strain gauges are formed on said membrane by epitaxial growth.

11. The ultraminiature pressure sensing apparatus of claim 1 or 2, in which at least two of said piezoresistive strain gauges are positioned within said membrane and at least two of said piezoresistive strain gauges are positioned on a neighboring support material.

12. The ultraminiature pressure sensing apparatus of claim 11 in which said piezoresistive strain gauges are positioned in a Wheatstone Bridge configuration.

* * * * *